US012623790B2

(12) United States Patent
Edwards

(10) Patent No.: US 12,623,790 B2
(45) Date of Patent: May 12, 2026

(54) AIRCRAFT ACCESS COVER

(71) Applicant: Airbus Operations Limited, Bristol (GB)

(72) Inventor: Henry Edwards, Bristol (GB)

(73) Assignee: Airbus Operations Limited, Filton Bristol (GB)

( * ) Notice: Subject to any disclaimer, the term of this patent is extended or adjusted under 35 U.S.C. 154(b) by 0 days.

(21) Appl. No.: 18/657,112

(22) Filed: May 7, 2024

(65) Prior Publication Data

US 2024/0391603 A1      Nov. 28, 2024

(30) Foreign Application Priority Data

May 26, 2023      (GB) ...................................... 2307967

(51) Int. Cl.
B64D 37/08       (2006.01)
B64C 1/14        (2006.01)
B64D 37/14       (2006.01)

(52) U.S. Cl.
CPC ............ B64D 37/08 (2013.01); B64C 1/1446 (2013.01); B64D 37/14 (2013.01)

(58) Field of Classification Search
CPC ........ B65D 37/08; B65D 37/02; B65D 37/14; B64C 1/1446; B60K 15/03
USPC ....... 220/4.14, 4.15, 4.12; 244/135 A, 135 B
See application file for complete search history.

(56) References Cited

U.S. PATENT DOCUMENTS

| | | | |
|---|---|---|---|
| 2009/0145517 A1 | 6/2009 | Cardozo | |
| 2013/0306796 A1 | 11/2013 | Alazraki | |
| 2015/0266589 A1 | 9/2015 | Blumer et al. | |
| 2018/0093780 A1 * | 4/2018 | Melton ................. | B64D 37/10 |
| 2018/0305037 A1 * | 10/2018 | Kooiman .............. | B64D 37/32 |
| 2024/0375762 A1 * | 11/2024 | De Oliveira Junior ..................... | |
| | | | B64C 1/1446 |

FOREIGN PATENT DOCUMENTS

| | | | | |
|---|---|---|---|---|
| EP | 2923948 A1 | 9/2015 | | |
| WO | WO-2006025927 A2 * | 3/2006 | .......... | B64D 37/005 |
| WO | 2009073939 A2 | 6/2009 | | |

OTHER PUBLICATIONS

United Kingdom Search and Examination Report for corresponding United Kingdom Patent Application No. 2307967.6 dated Oct. 23, 2023.

* cited by examiner

*Primary Examiner* — Rafael A Ortiz
(74) *Attorney, Agent, or Firm* — Greer Burns & Crain Ltd.

(57) ABSTRACT

A cover for covering an access port of a fuel storage structure of an aircraft, the access port is configured to allow a human operator to access an interior of a first container of the fuel storage structure. The cover comprises an inlet port configured to interface with and receive fuel from an aircraft refueling apparatus, and an outlet port fluidically connect-able to the inlet port and operable to provide the fuel received at the inlet port to the interior of the first container when the cover is arranged to cover the access port.

18 Claims, 6 Drawing Sheets

10, 120, 101

1000

AIRCRAFT ACCESS COVER

CROSS-REFERENCES TO RELATED APPLICATIONS

This application claims the benefit of Great Britain Patent Application Number 2307967.6 filed on May 26, 2023, the entire disclosure of which is incorporated herein by way of reference.

FIELD OF THE INVENTION

The present invention relates to access covers for aircraft fuel storage structures, as well as aircraft fuel storage structures comprising such access covers.

BACKGROUND OF THE INVENTION

Currently, refueling of aircraft can be performed by attaching a refueling apparatus to a refueling coupling on the leading edge of an aircraft wing. This refueling coupling provides fuel to a refuel manifold, guiding the fuel to a fuel tank of the aircraft. However, an obstruction external to the aircraft can complicate refueling from this refueling coupling, requiring maneuvering of the aircraft or refueling apparatus.

It is therefore desirable to provide alternative or more flexible refueling techniques that simplify the refueling process.

SUMMARY OF THE INVENTION

A first aspect of the present invention provides a cover for covering an access port of a fuel storage structure of an aircraft. The access port is configured to allow a human operator to access an interior of a first container of the fuel storage structure. The cover comprises an inlet port configured to interface with and receive fuel from an aircraft refueling apparatus, and an outlet port fluidically connectable to the inlet port and operable to provide the fuel received at the inlet to the interior of the first container when the cover is arranged to cover the access port.

The cover, comprising such an inlet port and outlet port, thereby provides an alternative refueling point for the aircraft, via which the first container can be refueled by the aircraft refueling apparatus. This can be useful when the location of the aircraft prohibits, limits, or otherwise renders refueling from a primary refueling interface difficult. For example, an obstruction external to the aircraft may complicate refueling from the primary refueling interface. Providing an extra refueling point may also allow the aircraft to be refueled more quickly due to an increased flow of fuel into the aircraft fuel storage.

In cases where the aircraft carries different types of fuel, such as a first type of fuel in the first container and a second type of fuel in a second fuel storage container, the inlet port and the outlet port of the cover can allow the first type of fuel to be delivered to the first container while the second type of fuel is provided to the second fuel storage container via, for example, a primary refueling interface. Providing two spatially separate refueling points, such that each type of fuel can be provided to the aircraft fuel storage separately, can reduce the risk of operator errors, for example, during a refueling process. Fuel types such as sustainable aviation fuels may not be compatible with all aircraft systems and hardware if used undiluted, for example. A dedicated refueling port, as provided by the cover, can hence be a means to avoid aircraft on ground delays and improve turnaround time of the aircraft.

Optionally, the cover further comprises a second container, wherein the cover and the second container are configured to be couplable to each other. The second container is configured to be insertable through the access port such that, when the cover is arranged to cover the access port, the second container is housed within the first container. In this embodiment, the outlet port is fluidically connectable to the second container. Further, the first container is configured to store a first type of fuel, whereas the second container is configured to store a second type of fuel. The inlet port is configured to receive the second type of fuel from the aircraft refueling apparatus such that the outlet port provides the second type of fuel to the second container.

The cover, comprising such a second container, can thereby allow the aircraft to store a first type of fuel and a second type of fuel, as discussed above. This can permit the aircraft to use different fuel types depending on, for example, whether the aircraft is maneuvering on the ground or flying. The first type of fuel can be provided to the aircraft by a separate primary refueling interface, whereas the second type of fuel can be provided to the aircraft by the inlet port of the cover. The cover, comprising such a second container, can thereby function as additional, modular fuel storage for the aircraft. The cover can be used for flights where a second type of fuel is required. For a flight where the second type of fuel is not required, the cover can be replaced with a traditional cover lacking inlet and outlet ports for fuel.

By housing the second container within the first container instead of, for example, mounting the second container on the outside of the aircraft as an external fuel storage structure, the second container does not negatively impact, for example, the aerodynamic performance of the aircraft.

Optionally, the cover is configured to form a portion of an internal wall of the second container. This may facilitate installation of the second container, as the container can be installed concurrently with the cover. In other words, the cover may be integral to the second container.

Optionally, the cover is configured to be coupled to the second container by a pipe, which fluidically connects the outlet port to the second container and hence allows the second container to be distanced from the cover. For example, the second container can during transit be stowed in a particular portion of the first container which might not be adjacent to the cover. The particular portion may be more structurally secure, for example, or may be spaced away from the cover to permit other instrumentation attached to the cover to function.

Optionally, the second container has a variable volume. A variable volume allows the fuel storage to be used more flexibly, as the second container can occupy a volume dependent on the amount of the second type of fuel it is required to carry. In this way, when a particular flight does not require the second type of fuel, or requires a limited amount of the second type of fuel, the second container can occupy a small volume and the first container can store more of the first type of fuel. In some examples, the second container can be arranged in a collapsed state in which the second container is insertable through the access port. This can simplify installation of the second container, as the operator can perform the installation without any additional access to the interior of the first container. Similarly, the collapsed state can simplify de-installation, or removal, of the second container, as it in the collapsed state can be more easily retracted from the first container. In further examples, the second container can be arranged in an inflated, or enlarged, state, in which it does not fit through the access port. In this way, the second container can fill or substantially fill a volume of the first container to increase or maximize storage of the second type of fuel. The second container can therefore be easily installed in a collapsed state and yet store a large quantity of the second type of fuel in the enlarged state. Additionally, in the enlarged state, the freedom of movement of the second container can be reduced, as the second container fills or substantially fills the first container and hence reduces the free space between the second container and the internal walls of the first container. This can prevent damage to the first container or the second container.

Optionally, the second container is a bladder. The bladder can have a variable volume. The bladder may be elastic such that it imparts a pressure on the second type of fuel stored within the second container. This can improve a rate at which the second type of fuel can be provided to the aircraft, for example. In examples, the second container comprises a portion which is a bladder.

Optionally, the second container is formed of reinforced fluorosilicone. Flourosilicone can be suitable for use with certain types of fuel and can be flexible, or deformable, such that the container can have a variable volume.

Optionally, the second container comprises a fuel release apparatus operable to release the second type of fuel from the second container into the first container. This can make it easier to install and integrate the second container with an existing fuel delivery system, as existing fuel lines from the first container to the engine can be used to carry the second type of fuel. The cover may hence be suitable for retrofitting into aircraft without modification, or with only minimal modification.

Optionally, the fuel release apparatus comprises a valve operable to release the second type of fuel from the second container into the first container. This can allow the second type of fuel to be selectively released from the second container into the first container. Further, the valve can prevent the first type of fuel from entering the second container.

Optionally, the cover comprises a first panel and a second panel that are configured to be attachable to each other such that a surface portion of the aircraft fuel storage structure is clampable between the first panel and the second panel when the first panel and the second panel are attached to each other. Such a clamping arrangement of the first panel and the second panel can reduce stresses through the surface of the aircraft fuel storage, as a need for bolt, or fastener, holes in the surface of the aircraft fuel storage can be reduced or negated. Such holes can otherwise act as stress raisers. Reducing the stress imparted on the fuel storage structure can further reduce the need for reinforcement of the fuel storage structure and hence the weight of the fuel storage structure. In some examples, the first panel comprises the inlet port and the outlet port, and the second panel comprises an opening configured to receive the outlet port. In other examples, the first panel comprises the inlet port and the second panel comprises the outlet port.

Optionally, the inlet port and outlet port are further configured to release fluid from within the fuel storage structure to outside the fuel storage structure. The fluid may, for example, comprise at least one of aviation fuel, aviation fuel vapor, and air.

A second aspect of the present invention provides an aircraft fuel storage structure comprising a first container comprising an access port configured to allow a human operator to access an interior of the first container, and a cover for covering the access port. The cover comprises an inlet port configured to interface with and receive fuel from an aircraft refueling apparatus and an outlet port, which is fluidically connectable to the inlet port and operable to provide the fuel received at the inlet to the interior of the first container when the cover is arranged to cover the access port.

The aircraft fuel storage structure, comprising the cover according to the first aspect, can achieve similar benefits to those described above.

Optionally, the cover is coupled to a second container arrangeable within the first container, wherein the second container is fluidically connectable to the outlet port and configured to store a second type of fuel. The second container is further configured to be insertable through the access port such that, when the cover is arranged to cover the access port, the second container is housed within the first container.

Optionally, the aircraft fuel storage structure further comprises a third container neighboring the first container, wherein the second container is arrangeable within the third container when the cover is arranged to cover the access port of the first container. In this way, the fuel storage structure offers flexibility in where the second container is stored and hence a flexibility in, for example, managing load distribution of the fuel within the fuel storage structure.

Optionally, the first container is a wing or fuselage fuel tank. In some examples, where the fuel storage structure further comprises a third container neighboring the first container, the first container is a first wing fuel tank configured to occupy a first rib bay and the third container is a second wing fuel tank configured to occupy a second rib bay.

A third aspect of the present invention provides an aircraft comprising a cover according to the first aspect, or an aircraft fuel storage structure according to the second aspect. The aircraft, comprising such a cover or such an aircraft fuel storage structure, can thereby be refueled from an alternative location compared to a traditional primary refueling interface. In examples where the cover or aircraft fuel storage structure comprises a second container, the aircraft can carry a first type of fuel and a second type of fuel which can improve performance of the aircraft, for example by using the first type of fuel at a first point of a flight and using the second type of fuel at a second point of the flight.

Features and advantages described for any particular aspect of the invention may be equally applied to other aspects of the invention where appropriate.

BRIEF DESCRIPTION OF THE DRAWINGS

Embodiments of the invention will now be described, by way of example only, with reference to the accompanying drawings, in which.

DETAILED DESCRIPTION OF THE PREFERRED EMBODIMENTS

Figure 1A:
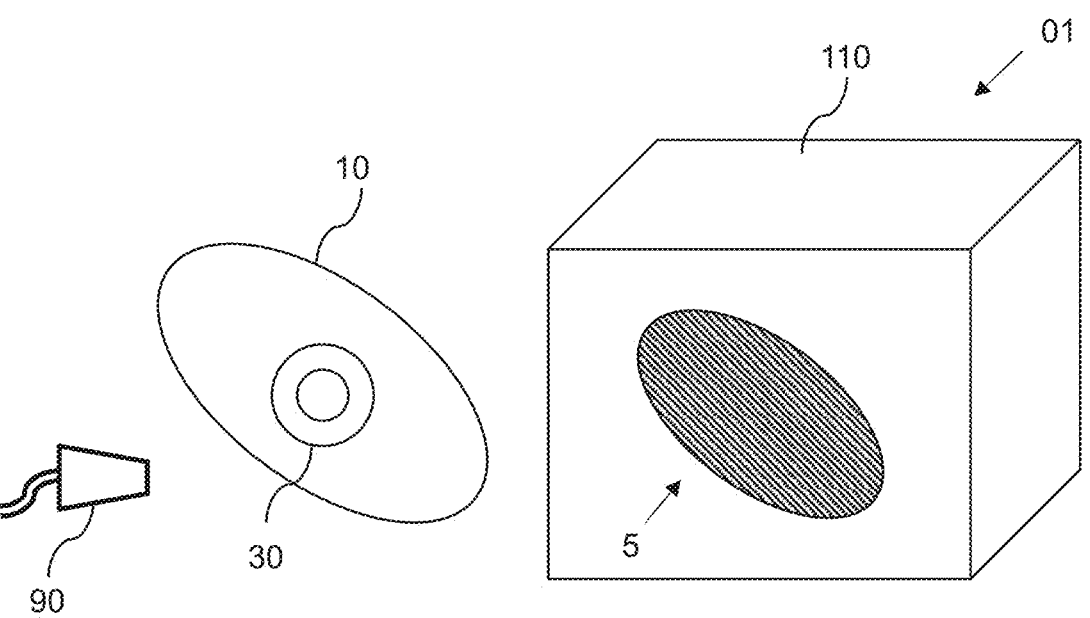
FIG. 1*a* shows a schematic views of a fuel storage structure according to an embodiment of the present invention.
Figure 1B:
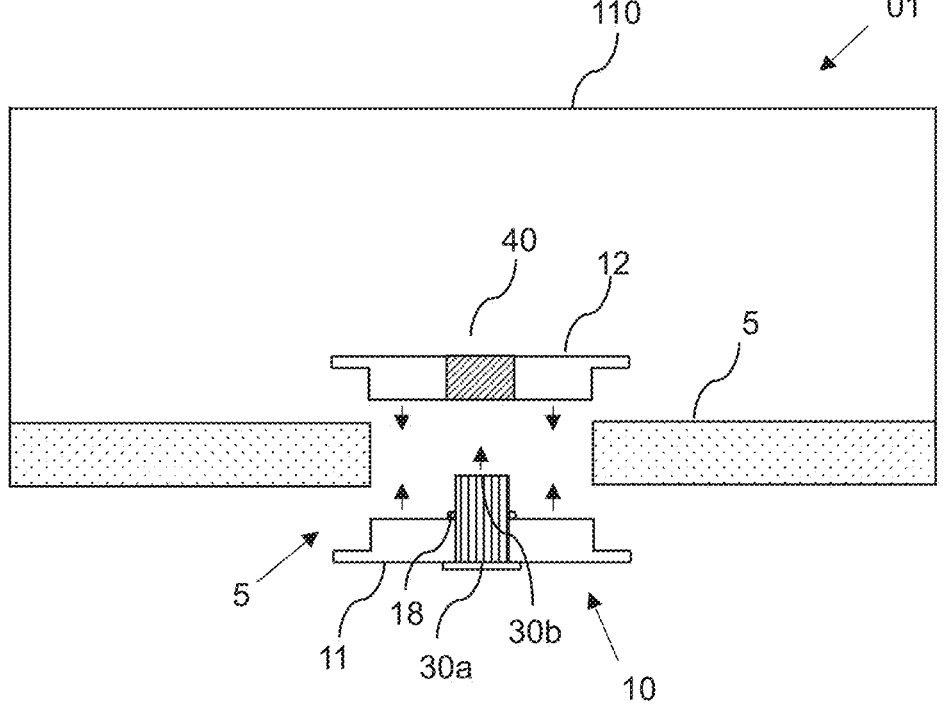
FIG. 1*b* shows another schematic views of a fuel storage structure according to an embodiment of the present invention.

FIGS. 1a and 1b schematically illustrate a cover 10 for an access port 5 of a fuel storage structure 101 of an aircraft, according to an example. The cover 10 is configured to cover an access port 5 of a first container 110 of the fuel storage structure 101.

The access port 5 is configured to allow a human operator to access an interior of the first container 110 of the fuel storage structure 101. As the skilled person will appreciate, access ports such as the access port 5 in the present example are typically provided to allow a human operator to access internal structures of the aircraft to perform maintenance, for example. Accordingly, access ports are typically designed to be secure and safe for an operator to enter and exit, and provide sufficient space for them to perform maintenance work. An access port can provide direct access into an interior of a fuel container. That is, an access port can be distinguished from other ports, which might be located in the vicinity of a fuel storage structure, but which do not provide a human operator with access to the interior of a fuel container, for example. In some cases, an access port cover comprises equipment used to monitor or interact with the interior of the fuel container, such as overpressure protectors. The access port 5 may alternatively be described as a manhole.

The first container 110 may be a fuel tank located in the wing of the aircraft (not pictured). The first container 110 may be a substantially rigid enclosure for the first type of fuel 111, whereby substantially rigid means that the majority or the entirety of the walls of the first container 110 are rigid such that the external and internal structure of the first container undergoes minimal change in shape during regular use.

The cover 10 is configured to cover the access port 5. FIG. 1b illustrates a cross-sectional view of the structure of cover 10 and the first container 110. In this example, the cover 10 comprises a first panel 11 and a second panel 12. The first panel 11 and the second panel 12 are attachable to each other and, when attached, such that a surface portion of the fuel storage structure 101, in this example a surface 115 of the first container 110, is clamped therebetween. This can be referred to as a clamping configuration of the cover 10. The cover 10, when arranged to cover the access port 5, seals the access port 5 and hence the first container 110 of the fuel storage structure. In other examples, the cover 10 may comprise a single-panel construction such that the cover 10 is directly fastened to the surface 115 via bolts, for example, rather than clamping the surface 115.

The first panel 11 of the illustrated cover 10 comprises an inlet port 30a and an outlet port 30b. The inlet port 30a is located on a first surface of the first panel 11 and the outlet port 30b is located on a second surface of the first panel 11, the second surface facing in an opposite direction to the first surface. The second panel 12 comprises an opening 40 arranged to receive the outlet port 30b. When the cover 10 is arranged to cover the access port 5, the outlet port 30b passes through the opening 40 and faces the interior of the first container 110, and the inlet port 30a faces externally to the first container 110. A seal element 18 is arranged circumferentially around the outlet port 30b to fluidically seal the interface of the first panel 11 with the second panel 12 and ensure that fuel stored within the first container 110 does not leak.

The inlet port 30a is configured to interface with an aircraft refueling apparatus 90. The aircraft refueling apparatus 90 is operable to deliver fuel, such as aviation fuel, at pressure to the inlet port 30a. The inlet port 30a and the outlet port 30b are fluidically connected such that fuel provided at the inlet port 30a can flow to the outlet port 30b. In this way, fuel provided at the inlet port 30a traverses through the first panel 11 of the cover. Because the outlet port 30b passes through the opening 40 of the second panel 12, the outlet port 30b can provide fuel received at the inlet port 30a to the interior of the first container 110. In this way, the inlet port 30a and outlet port 30b can be regarded as providing a refueling interface for the first container 110, such that the first container 110 can be refueled with the first fuel type 111.

In this example, the inlet port 30a and outlet port 30b are disposed on the first panel 11, and the second panel 12 comprises an opening 40 arranged to accommodate the outlet port 30b. In other examples, however, the inlet port 30a may be arranged on the first panel 11 and the outlet port 30b on the second panel 12. In general, the inlet port 30a is arranged to receive fuel from a first side of the cover 10, whereas the outlet port 30b is arranged on an opposite side of the cover 10.

In this example, the access port 5 is large enough to accommodate both arms of a human operator and/or equipment held by the operator. In other examples, the access port may be large enough to accommodate, for example, a torso of a human operator, or may only be large enough to accommodate, for example, a single arm of a human operator or piece of equipment held by the human operator. The skilled person will appreciate that the precise size of the access port is immaterial to the present disclosure.

The cover 10, being removable from the access port 5, can be utilized in a modular fashion. For example, for flights where refueling capabilities of the cover 10 are not required, the cover can be replaced by a traditional cover. Similarly, the cover 10 may be retrofitted onto existing aircraft, as internal modifications to the aircraft fuel storage structures may not be required.

As described herein, installation of the cover 10 to the access port 5 can refer to arranging the cover 10 to seal, or cover, the access port 5, for example such that the first container 110 of the fuel storage structure 101 is sealed and suitable for flight. Similarly, removal, or deinstallation, of the cover 10 from the access port 5 can refer to the process of removing the cover 10 from the access port 5 such that the access port 5 is open for an operator to perform a maintenance operation, for example.

Figure 2:
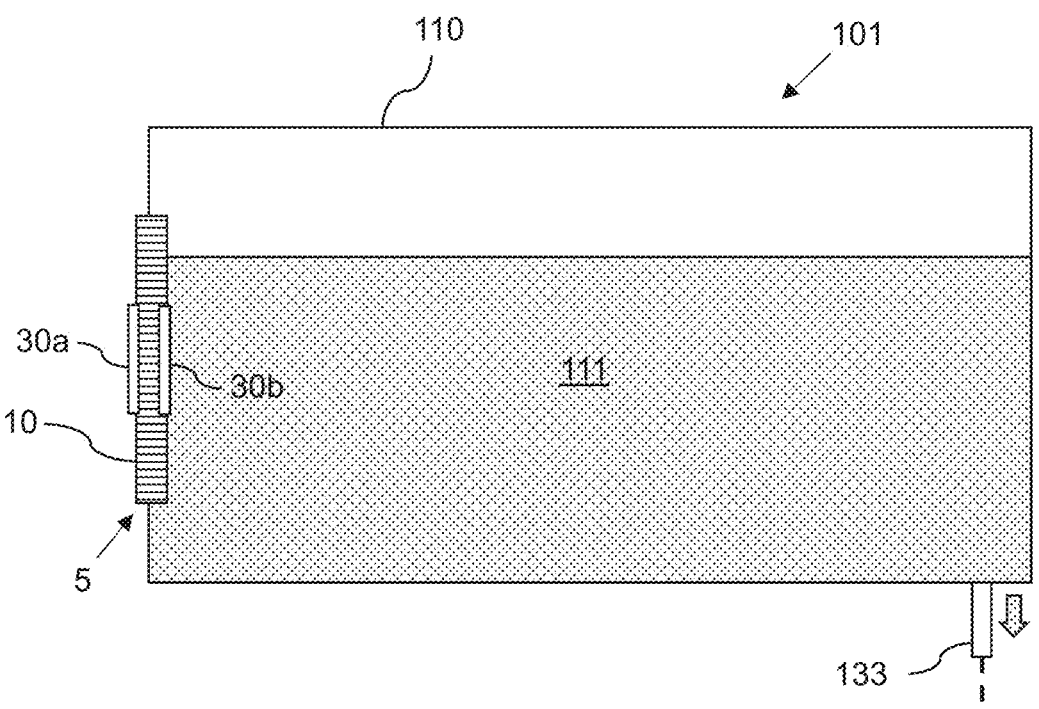
FIG. 2 shows a schematic view of the fuel storage structure according to an embodiment of the present invention.

FIG. 2 illustrates schematically the example cover 10 of FIG. 1a, 1b during use. In FIG. 2, the first container 110 is storing a first type of fuel 111. The first type of fuel 111 in this example is a typical aviation fuel. Aviation fuel as described here relates to e.g. hydrocarbon-based fuels such as kerosene-based fuels which are typically used to power aircraft. The aircraft refueling apparatus 90 has interfaced with the inlet port 30*a* and provided the first type of fuel 111 to the inlet port 30*a*. The fuel has flowed from the inlet port 30*a* to the outlet port 30*b* and filled the first container 110. Because the cover 10 seals the access port 5, the first type of fuel 111 is retained inside the first container 110. An engine feed line 133 provides the first type of fuel 111 stored in the first container 110 to the engine. The engine feed line 133 is described in more detail later, in view of FIGS. 5*a* and 5*b*.

FIGS. 3, 4, 5*a* and 5*b* illustrate schematically a cover 10*b* according to examples which may be similarly configured as the cover described above with reference to FIGS. 1*a*, 1*b* and 2.

Figure 3:
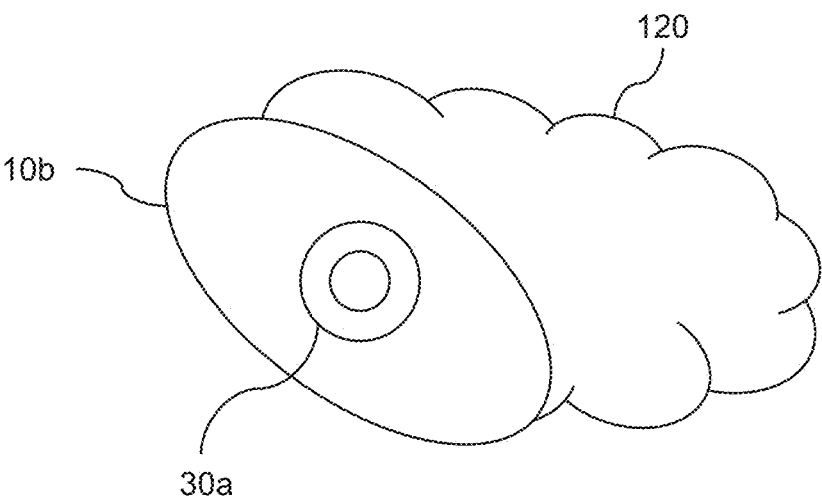
FIG. 3 shows a schematic view of a cover according to an embodiment of the present invention.

FIG. 3 illustrates schematically the cover 10*b* in isolation from the fuel storage structure 101. The cover 10*b* illustrated in FIG. 3 is similar to the cover of FIGS. 1*a*, 1*b* and 2, in that it comprises a two-panel structure configured to clamp a surface of the fuel storage structure 101, and an inlet port 30*a* and an outlet port 30*b* for receiving fuel from an aircraft refueling apparatus in order to provide fuel into the fuel storage structure. However, the cover 10*b* further comprises, or is attached to, a second container 120. The second container 120 is configured to store a second type of fuel 121. The second container 120 is arrangeable within the first container 110 such that, when the cover 10*b* covers the access port 5, the first container 110 can be considered to house the second container 120. In other words, the second container 120 is located inside the first container 110 and surrounded by internal walls of the first container 110. In this way, the first type of fuel 111 and the second type of fuel 121 can be stored within a common volume, that is, the volume within the first container 110. The first type of fuel 111 is physically isolated from the second type of fuel 121 when the second type of fuel 121 is stored in the second container 120 such that the two types of fuel do not mix. This can be seen in more detail in FIGS. 5 and 5*b*, described shortly.

In the present example, the second container 120 is a fuel bladder formed of, e.g., fluorosilicone. Beneficially, the second container 120, being a fuel bladder, may be deformable, thereby facilitating insertion and removal through the access port 5. This can simplify installation of the cover 10 to the access port 5 and installation of the second container 120 within the first container 110. In general, the second container 120 having a deformable structure can accordingly improve ease of installation of the cover 10*b* and/or the second container 120.

The second container 120, being formed of, in this example, fluorosilicone, can be usable to store, for example, sustainable aviation fuels. In some examples, the material of the second container could be reinforced with Kevlar which can be compatible with aircraft fuels. Such reinforcement can improve the durability of the second container and thereby improve safety of the fuel storage structure. In other examples, the second container may be formed of nitrile.

The cover 10*b* can be considered to form a portion of an internal wall of the second container 120. That is, when the second container 120 is storing the second type of fuel 121, the second type of fuel 121 is in contact with a portion of the cover 10*b*. In this sense, the second container 120 can be considered to be integrated with the cover 10*b*. By integrating the cover 10*b* with the second container 120, the overall size of the second container 120 can be reduced because a portion of the internal wall is already provided by the cover 10*b*. The cover 10*b*, forming a portion of the internal wall of the second container 120, can also act to structurally support the second container 120 within the first container 110 as the cover 10*b* is mechanically attached to the first container 110.

This can reduce movement of the second container 120 within the first container 110. Specifically, in this example, due to the clamping configuration of the cover 10, the second panel 12 of the cover forms the portion of the internal wall of the second container 120.

Figure 4:
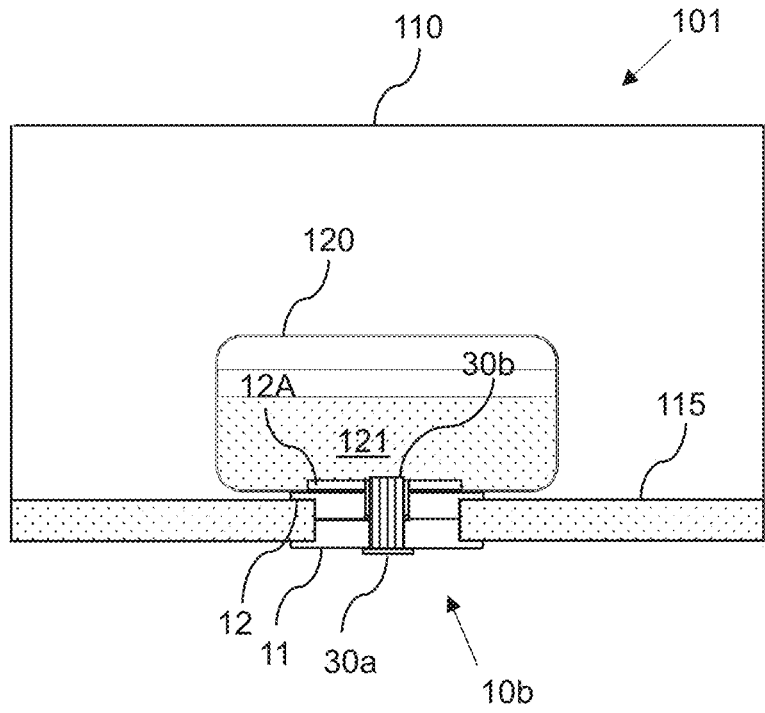
FIG. 4 shows a schematic view of a fuel storage structure according to an embodiment of the present invention.

FIG. 4 schematically illustrates the cover 10*b* arranged to cover the access port 5 of the first container 110 of the fuel storage structure 101. The first panel 12 and second panel 11 of the cover 10*b* are arranged to clamp the surface 115 of the first container 110, thereby sealing the first container 110. The second container 120, coupled to the cover 10*b*, specifically in this example to the second panel 12 of the cover 10*b* by a spreader plate 12A, is arranged within the first container 110.

In the example illustrated by FIG. 4, the refueling apparatus 90 (not pictured) has provided a second type of fuel 121 to the inlet port 30*a*. The second type of fuel 121 has flown from the inlet port 30*a* to the outlet port 30*b* and at least partially filled the second container 120. In this way, the inlet port 30*a* and the outlet port 30*b* act as a refueling interface for the second type of fuel 121 to the second container 120, which can be used separately from, for example, a primary refueling interface which might provide the first type of fuel 111 to the first container 110. The fuel storage structure 101 is thereby able to store a first type of fuel 111 and a second type of fuel 121 within a common volume.

Figures 5A, 5B:
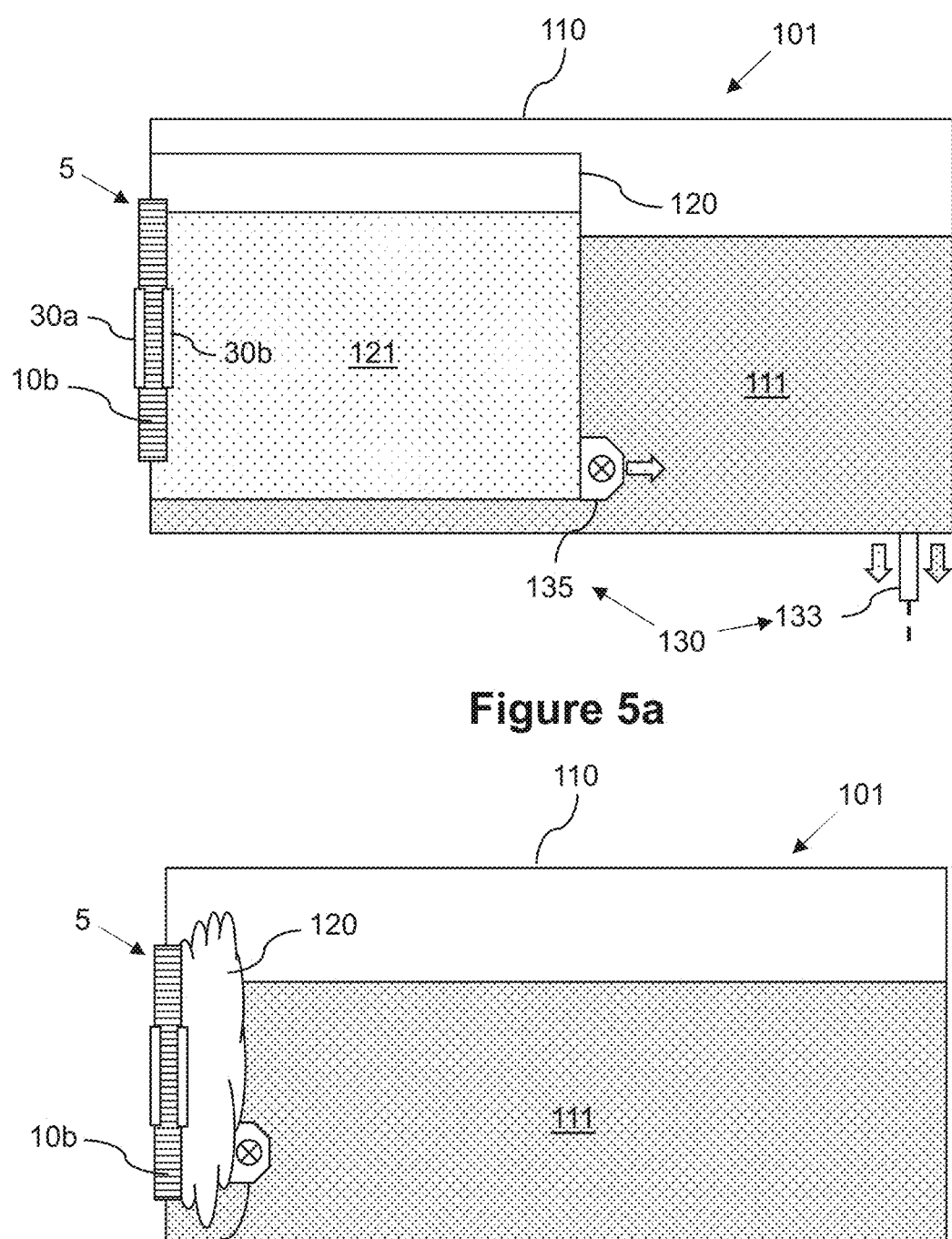
FIG. 5a shows a schematic view of a fuel storage structure according to an embodiment of the present invention.
FIG. 5b shows a schematic view of a fuel storage structure according to an embodiment of the present invention.

FIG. 5*a* schematically illustrates the cover 10*b* and fuel storage structure 101 according to an embodiment. The cover 10*b* may clamp the surface 115 of the fuel storage structure 101 in a manner similar to the one discussed above in connection with FIG. 4. In FIG. 5*a*, the first container 110 is storing a first type of fuel 111 and the second container 120 is storing a second type of fuel 121.

As described above, the second container 120 has a variable volume, allowing the volume of the second container 120 to be varied with the amount of the second type of fuel 121 currently stored within the second container 120. In FIG. 5*a*, the second container 120 is storing the second type of fuel 121 and can be considered to be in an enlarged state. When in an enlarged state, the second container 120 can be too large to fit through the cover 10*b*. In this sense, the second container 120 can store more fuel than a container having a fixed volume, which is insertable through access port 5, would be capable of.

In FIG. 5*b*, the second container 120 is empty and can thus be considered to be in a collapsed state. As shown in FIG. 5*b*, this allows the first container 110 to store a greater volume of the first type of fuel 111 than what would have been possible if the second container 120 had a fixed volume. In this way, even if the second container 120 is permanently disposed within the first container 110, storage capabilities of the first container, such as the total volume of fuel storable by the first container 110, are not impacted, or are impacted less severely, than compared with a container having a fixed volume.

The fuel storage structure 101 may comprise a fuel release apparatus 130 which is operable to provide the first type of fuel 111 and the second type of fuel 121 to the engine of the aircraft. In general, fuel release apparatus may refer to parts of, or an entire infrastructure required to transport fuel from the respective containers all the way to the engine, for example pumps, conduits, valves, and control devices thereof. In the example shown in FIGS. 5*a* and 5*b*, the fuel release apparatus comprises a valve 135 and an engine feed line 133. The valve 135 and the engine feed line 133 can each be employed to regulate the amount of first type of fuel 111 and the second type of fuel 121 supplied to the engine of the aircraft.

The valve 135 in FIGS. 5a and 5b is arranged within the second container 120 such that the valve 135 can regulate release of the second type of fuel 121 from the second container 120 into the first container 110. In the example of FIGS. 5a and 5b the valve 135 is an actuator-controlled valve which can be remotely instructed to release the second type of fuel 121 from the second container 120 into the first container 110. In this way, a mix, or blend, of the first type of fuel 111 and the second type of fuel 121 can be produced, or prepared, in the first container 110.

In other examples, the valve 135 can be a float-valve configured to passively measure a volume of fuel stored within the first container 110 and accordingly release the second type of fuel 121 from the second container 120 based on this volume. This allows for passive control of the fuel without requiring active control. A float valve can be arranged to release the second type of fuel 121 from the second container 120 once the first type of fuel in the first container 110 has been depleted, or has reached a predetermined amount, for example half full or a quarter full.

In some examples wherein the second container 120 is deformable, a pressure of the first type of fuel 111, or the mix of the first type of fuel 111 and the second type of fuel 121 in the first container 110, can be transmitted to the second type of fuel 121 stored within the second container 120. The pressure of the first type of fuel 111 can hence facilitate release of the second type of fuel 121 into the engine feed line 133.

The engine feed line 133 may be configured to transport fuel from the first container 110 to the engine. The engine feed line 133 may interface with a fuel distribution network of the aircraft. When the first container 110 is only storing the first type of fuel 111, and the second container 120 is either empty (such as FIG. 5b) or has not released the second type of fuel 121 into the first container 110, the engine feed line 133 may provide the first type of fuel 111 to the engine. When the second container 120 has released some of the second type of fuel 121 into the first container 110, such that a mix of the first type of fuel and the second type of fuel 121 is stored by the first container 110, the engine feed line 133 may provide the mix of the first type of fuel 111 and the second type of fuel 121 from the first container 110 to the engine.

In the example of FIG. 5a, the first type of fuel 111 is regular aviation fuel and the second type of fuel 121 is a sustainable aviation fuel. Regular aviation fuel will be understood by the skilled person to be, for example, Jet A or Jet A1 fuels. The skilled person will appreciate that sustainable aviation fuel, SAF, is a term referring to fuels derived in a more sustainable manner, such as from non-fossil sources. Sustainable aviation fuel may have lower sulfur content and/or produce less soot than regular aviation fuel.

In general, the cover 10b, comprising an inlet port 30a and outlet port 30b, and the second container 120 can be installed, and in some cases retrofitted, to an aircraft to an existing access port 5. In doing so, the cover 10b permits the aircraft to store and utilize multiple types of fuel. Due to the relatively high cost of some types of fuel, it may be undesirable to have permanent storage arranged for some types of fuel as the types of fuel may only be used on select journeys, for example, and the associated storage is otherwise wasted. The cover 10b can be installed and uninstalled in a modular fashion, so can be used flexibly according to flight requirements.

Figure 6:
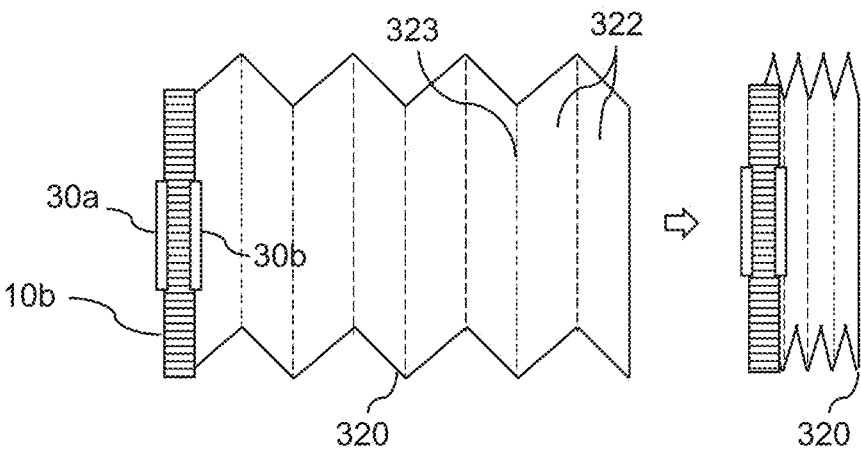
FIG. 6 shows a schematic view of a second container according to an embodiment of the present invention.

FIG. 6 illustrates schematically a further example of a second container 320. In the examples of FIGS. 3, 4, 5a, and 5b, the second container 120 is a bladder. In the example of FIG. 6, the second container 320 comprises a concertina shaped structure, or bellows shaped structure. Rigid parts 322 are connected at flexible joints 323 such that the second container 320 can be considered to be foldable. The foldable concertina shaped structure allows for the volume of the second container 320 to be variable. Further, the rigid parts 322 may allow for the second container 320 to be more structurally robust against impact, thereby improving the safety of the fuel storage structure 101. The second container 320 being foldable allows it to be straightforwardly retained in a compact fashion within the first container 110, for example when not in use.

Figure 7:
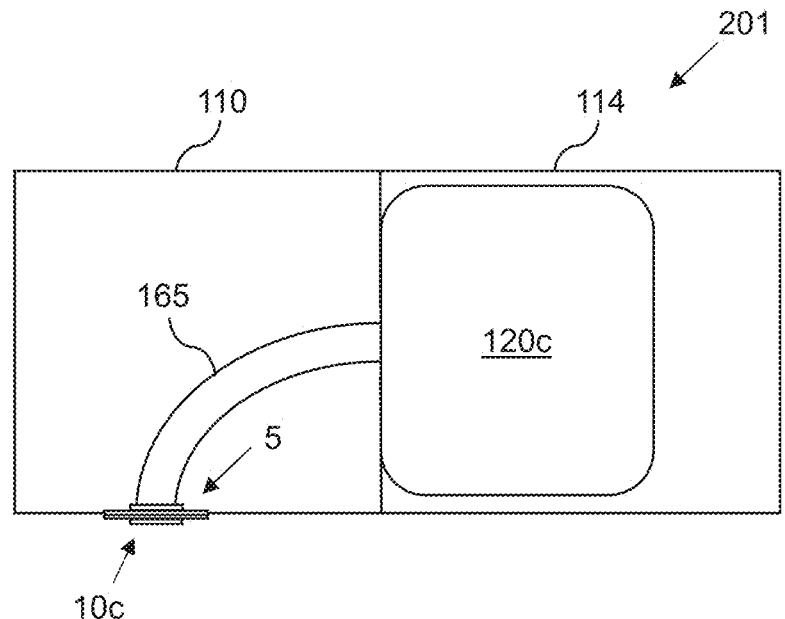
FIG. 7 shows a schematic view of a fuel storage structure according to an embodiment of the present invention.

FIG. 7 illustrates an aircraft fuel storage structure 201 according to an example. As in previous examples, the fuel storage structure 201 comprises a first container 110 and an access port 5 of the first container 110 which is covered by a cover 10c.

The cover 10c comprises a second container 120c which performs a substantially similar function to the second containers 120 described in previous examples. However, the second container 120c is not integrated with the cover 10c in the same way as the example of FIGS. 3-5. Instead, the second container 120c is connected to the cover 10c by a connector 165. The connector 165 is tube, or conduit, which fluidically connects the outlet port (not pictured) of the cover 10c to the second container 120c.

The depicted fuel storage structure comprises a third container 114 which is adjacent to the first container 110. That is, they can be considered to be neighboring containers. In this example, the first container 110 is a first wing fuel tank occupying a first rib bay and the third container 114 is a second fuel tank occupying a second rib bay, the first rib bay neighboring the second rib bay.

The second container 120c is housed inside the third container 114, similar to the way in which the second container 120 is housed inside the first container 110 in previous examples. The connector 165 traverses the first container 110, coupling with the cover 10c at a first end and the second container 120 at a second end. The cover 10c thereby provides an inlet port for refueling at the cover 10, but stores the fuel provided at the inlet port in the second container 120 which is in a different location, that is, not within the volume of the first container 110. Being able to position the second container 120 can be useful, for example, in achieving a particular weight distribution of fuel within the aircraft.

In examples where the connector 165 is flexible, the second container 120 can be moved independently from the cover 10c. In this way, the second container 120 can be, for example, fixed in an installed position, and the cover 10c removed from the access port 5 without disturbing the second container 120. This can allow maintenance of the first container 110 to be carried out whilst the second container 120 remains installed.

Figure 8:
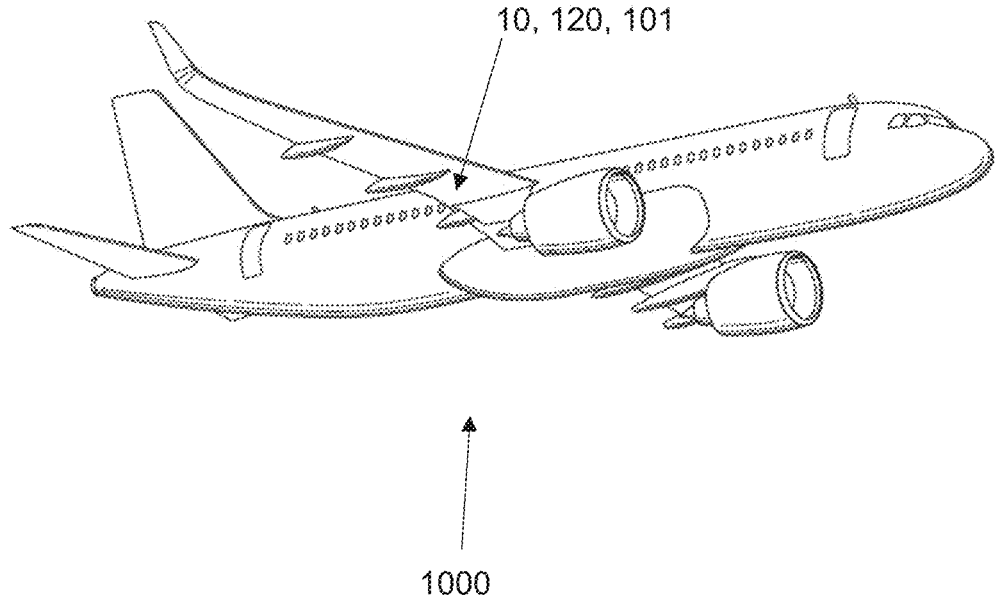
FIG. 8 shows a schematic view of a fuel storage structure according to an embodiment of the present invention.

In the example of FIG. 8, the cover 10 with an associated second container 120 has been retrofitted into an existing wing fuel tank storage structure 101 of the aircraft 1000. This is possible because the second container 120, having a variable volume and being deformable, can be installed within the existing wing fuel tank storage structure and the cover 10 installed onto an existing access port 5 of the fuel tank storage structures. The cover 10 can therefore be conveniently installed to an aircraft after initial construction of the aircraft, further enhancing utility of fuel storage structure 101. Similarly, by being deformable and having variable volume, maintenance can be performed by removing the cover 10 and associated second container 120. In some examples, a replacement cover and associated second container may be substituted in whilst the removed cover 10 and associated second container 120 undergoes maintenance such that the aircraft can continue to operate, which can reduce downtime of the aircraft.

The above embodiments are to be understood as an illustrative example of the invention. Further embodiments of the invention are envisaged:

In the above example, the second container 120 has a variable volume. In some examples, the second container can have a fixed volume but is shaped such that it is insertable through the access port. In such a case the second container may have a substantially rigid structure. This can be useful when, for example, only a smaller quantity of the second type of fuel is required to be carried and it is not necessary to substantially fill the first container.

The above examples describe a two-panel cover which is clampable about the rim of the access port. In other examples, and as described previously, the cover may be a single-panel cover but otherwise comprise substantially the same features, where appropriate.

The above examples describe the cover comprising a single inlet port and outlet port. In other examples, the cover may comprise a second inlet port fluidically coupled to a second outlet port, for example, and an additional container insertable through the access port and fluidically coupled to the second outlet port. In general, a cover may comprise multiple such inlet ports with corresponding outlet ports and containers. This can enable multiple fuel types to be delivered to the aircraft fuel storage structure from a single cover. Each inlet port and outlet port and container may correspond to a respective type of fuel. Additionally, a given inlet port may feed multiple outlets such that multiple containers can be refueled from the inlet port.

In the above examples, a fuel storage structure in the wing of an aircraft is described. In other examples, the fuel storage structure may be located in another area of the aircraft, for example a center-wing box, auxiliary center tank or rear-center tank. In some examples, the fuel storage structure may be an external drop tank or pod, and the cover provide, for example, a similar alternate refueling location as described for the previous examples.

In the above examples, the second container is described as carrying a second type of fuel. In other examples, the second container could be configured to store any fluid for which it is desirable to store separately within the confines of an existing fuel tank boundary for safety or certification reasons, for example. The second container may store fuel additives, for example. In other examples, the second container may be configured to store biocide or water emulsifier.

In examples, the inlet port and outlet port may additionally be, or alternatively be, configured to release fluid from within the fuel storage structure. For example, the inlet port and outlet port may be operable to release fuel or fuel vapour or air from within the fuel storage structure, such as from within the first container or from within the second container. It will be appreciated that 'fuel' can refer to the first type of fuel or the second type of fuel. In such examples, refueling might occur through a conventional refueling interface of the aircraft, whilst the fuel storage structure is concurrently vented by releasing air or fuel vapour through the inlet port and outlet port of the cover. This can allow air, fuel vapour, or liquid fuel to be removed from the aircraft in a controlled fashion without, for example, being released into the surrounding environment of the aircraft. In such an example, the inlet port may essentially function as an outlet and the outlet port described above may function as an inlet. The inlet port, being configured to interface with and receive fuel from an aircraft refueling apparatus, may additionally or alternatively be configured to interface with a vent connector.

It is to be noted that the term "or" as used herein is to be interpreted to mean "and/or", unless expressly stated otherwise.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A cover for covering an access port of a fuel storage structure of an aircraft, the access port being configured to allow a human operator to access an interior of a first container of the fuel storage structure, the cover comprising:

an inlet port configured to interface with and receive fuel from an aircraft refueling apparatus, an outlet port fluidically connectable to the inlet port and operable to provide the fuel received at the inlet port to the interior of the first container when the cover is arranged to cover the access port, and a second container, wherein:

the cover and the second container are configured to be coupled to each other, the second container is configured to be inserted through the access port such that, when the cover is arranged to cover the access port, the second container is housed within the first container, the outlet port is fluidically connectable to the second container, the first container is configured to store a first type of fuel and the second container is configured to store a second type of fuel, and the inlet port is configured to receive the second type of fuel from the aircraft refueling apparatus such that the outlet port provides the second type of fuel to the second container.

2. The cover according to claim 1, wherein the cover is configured to form a portion of an internal wall of the second container.

3. The cover according to claim 1, wherein the cover is configured to be coupled to the second container by a pipe which fluidically connects the outlet port to the second container.

4. The cover according to claim 1, wherein the second container has a variable volume.

5. The cover according to claim 4, wherein the second container is configured to be arranged in a collapsed state in which the second container is inserted through the access port.

6. The cover according to claim 1, wherein the second container is at least one of:

a bladder, and formed of reinforced fluorosilicone.

7. The cover according to claim 1, wherein the second container comprises a fuel release apparatus configured to release the second type of fuel from the second container into the first container.

8. The cover according to claim 7, wherein the fuel release apparatus comprises a valve configured to release the second type of fuel from the second container into the first container.

9. The cover according to claim 1, wherein the cover comprises a first panel and a second panel that are configured to be attached to each other such that a surface of the aircraft fuel storage structure is clamped between the first panel and the second panel when the first panel and the second panel are attached to each other.

10. The cover according to claim 9, wherein the first panel comprises the inlet port and the outlet port, and the second panel comprises an opening configured to receive the outlet port.

11. The cover according to claim 9, wherein the first panel comprises the inlet port and the second panel comprises the outlet port.

12. The cover according to claim 1, wherein the inlet port and the outlet port are further configured to release fluid from within the fuel storage structure to outside the fuel storage structure, the fluid comprising at least one of aviation fuel, aviation fuel vapor, or air.

13. An aircraft comprising:

the cover of claim 1.

14. An aircraft fuel storage structure comprising:

a first container comprising an access port configured to allow a human operator to access an interior of the first container, and a cover for covering the access port, the cover comprising:

an inlet port configured to interface with and receive fuel from an aircraft refueling apparatus, and an outlet port fluidically connectable to the inlet port and operable to provide the fuel received at the inlet port to the interior of the first container when the cover is arranged to cover the access port, wherein the cover is coupled to a second container configured to be arranged within the first container, the second container being fluidically connectable to the outlet port and being configured to be insertable through the access port such that, when the cover is arranged to cover the access port, the second container is housed within the first container, wherein the first container is configured to store a first type of fuel and the second container is configured to store a second type of fuel.

15. The aircraft fuel storage structure of claim 14, further comprising a third container neighboring the first container, wherein the second container is configured to be arranged within the third container when the cover is arranged to cover the access port of the first container.

16. The aircraft fuel storage structure of claim 14, wherein the first container is a wing or fuselage fuel tank.

17. The aircraft fuel storage structure of claim 15, wherein the first container is a first wing fuel tank occupying a first rib bay and the third container is a second wing fuel tank occupying a second rib bay.

18. A cover for covering an access port of a fuel storage structure of an aircraft, the access port being configured to allow a human operator to access an interior of a first container of the fuel storage structure, the cover comprising:

an inlet port configured to interface with and receive fuel from an aircraft refueling apparatus, and an outlet port fluidically connectable to the inlet port and operable to provide the fuel received at the inlet port to the interior of the first container when the cover is arranged to cover the access port, wherein the cover comprises a first panel and a second panel that are configured to be attached to each other such that a surface of the aircraft fuel storage structure is clamped between the first panel and the second panel when the first panel and the second panel are attached to each other, and wherein either:

the first panel comprises the inlet port and the outlet port, and the second panel comprises an opening configured to receive the outlet port, or the first panel comprises the inlet port and the second panel comprises the outlet port.

* * * * *